United States Patent [19]

Richter

[11] Patent Number: 5,457,537
[45] Date of Patent: Oct. 10, 1995

[54] OPTICAL-ELECTRICAL MEASURING METHOD FOR DETERMINING CROSS-SECTIONAL DIMENSIONS

[76] Inventor: Bruno Richter, Der alte Berg 16, D-8602 Stegaurach-Debring, Germany

[21] Appl. No.: 988,096

[22] Filed: Dec. 9, 1992

[51] Int. Cl.$^6$ .................................................. G01B 11/08
[52] U.S. Cl. ........................ 356/372; 356/385; 356/387
[58] Field of Search ................................. 356/372, 375, 356/376, 380, 386–387, 398, 384, 385; 250/224, 560, 561

[56] References Cited

U.S. PATENT DOCUMENTS

| | | | |
|---|---|---|---|
| 3,461,299 | 8/1969 | Felix | 356/387 |
| 3,870,890 | 3/1975 | Binks et al. | 356/387 |
| 3,922,094 | 11/1975 | Colding et al. | 356/375 |
| 4,227,812 | 10/1980 | Pirlet | 356/372 |
| 4,227,813 | 10/1980 | Pirlet | 356/372 |
| 4,432,648 | 2/1984 | Musto et al. | 356/387 |
| 4,648,718 | 3/1987 | Sadamitsu et al. | 356/387 |
| 4,709,156 | 11/1987 | Murphy et al. | 356/376 |
| 4,737,031 | 4/1988 | Mahlberg et al. | 356/372 |
| 5,028,798 | 7/1991 | Biswas et al. | 356/385 |

FOREIGN PATENT DOCUMENTS

| | | |
|---|---|---|
| 0078741 | 5/1983 | France . |
| 2849252C3 | 7/1981 | Germany . |
| 3219389A1 | 11/1983 | Germany . |
| 3503086C1 | 6/1986 | Germany . |
| 0177006 | 7/1988 | Japan ..................................... 356/387 |

*Primary Examiner*—Hoa Q. Pham
*Attorney, Agent, or Firm*—Fishman, Dionne & Cantor

[57] ABSTRACT

An optical-electrical measuring method for determining cross-sectional dimensions particularly of elongate articles with reference to at least one straight line, which is applied to the periphery of the cross-section and contacts the cross-section at, at least two points, and apparatuses for carrying out that method are presented. A light beam moved within a measuring field by a parallel displacement transverses at measurable locations in the measuring field boundaries of a region which is vignetted by the article disposed in the measuring field. The surface of the article is illuminated at a point by the same light beam when it has been deflected or by another light beam, and the distance from the axis of the light beam at the location of a predetermined boundary of the vignetted region to that illuminated point is determined in that an image of that point is formed at an angle which differs from the angle of the illumination and the location of the image is determined by triangulation. The entire measuring system is pivotally moved relative to the orientation of the cross-section of the article about an axis which is parallel to the longitudinal axis of the article. As a result, a detectable discontinuity of the change of the determined distance is detected, which discontinuity is characteristic of that angular position of the measuring system in which the axis of the light beam at the location of the predetermined boundary of the vignetted region contacts the periphery of the cross-section at at least two spaced apart points.

13 Claims, 4 Drawing Sheets

OPTICAL-ELECTRICAL MEASURING METHOD FOR DETERMINING CROSS-SECTIONAL DIMENSIONS

BACKGROUND OF THE INVENTION

This invention relates to an optical-electrical measuring method, in which cross-sectional dimensions particularly of elongate articles are determined in geometric analogy to the known operation of mechanical depth indicators in that the distance from a point to be measured at the periphery of a cross-section to a straight reference line is determined, which contacts the periphery of the cross-section at at least two spaced apart points. By a pivotal movement of the entire measuring system a light beam, which is moved in the measuring field by a parallel displacement, is caused to contact in a measurable position assumed during that movement the periphery of the cross-section at said at least two points which determine the straight reference line when the measuring system is in a detectable angular position, and the distance from the point to be measured to the axis of the light beam in that contacting position is determined.

A method of that kind has been proposed in Published German Application 32 19 389, which is incorporated herein by reference and an apparatus for carrying out the method has also been described there. By means of that apparatus it is possible, e.g., to measure the movement of the light beam during its parallel displacement through the measuring field from its entrance into the region which is vignetted by the article disposed in the measuring field to its re-exit from that region when the entire measuring system is in such an angular position that the light beam exiting from the vignetted region contacts the periphery of the cross-section at at least two points, which determine a straight reference line. In that manner it is possible to measure at an angle section the width of each leg as the perpendicular distance from its terminal generatrix to the outside surface of the respective other leg or the height of a tee section. But that known measuring method cannot be used for measurements of the above-mentioned kind unless the point to be measured and those points on the periphery of the cross-section which determine the straight reference line constitute the boundaries of the vignetted region.

But for a complete measurement of angle, tee, C or I sections or similar elongate products it is necessary also to measure leg thicknesses, flange thicknesses, web thicknesses and flange depths in cases in which terminal points of a distance to be measured or points of the straight reference line lie in all angular positions of the measuring system at such locations that they are covered by the shadow cast by other parts of the periphery of the cross-section in parallel or parallel-scanning light so that they do not constitute the boundaries of the vignetted region. For this reason such sections cannot completely be measured by means of the known method.

SUMMARY OF THE INVENTION

The above-discussed and the drawbacks and deficiencies of the prior art are overcome or alleviated by the optical-electrical measuring method for determining cross-sectional dimensions of the present invention. In accordance with the method of the present invention a measuring apparatus is provided in which a scanner for generating a light beam that is rapidly moved through the measuring field by a parallel displacement is mounted on one side of the measuring field on a motor-driven swivel mount. The swivel mount is pivotally movable about the article to be examined, and a receiver for receiving the light beam generated by the scanner and for generating electric signals in dependence on the vignetting of that light ray is mounted on the swivel mount on the other side of the measuring field. An optical-electrical distance sensor having a line of action that crosses in the measuring field the light beam generated by the scanner is also mounted on the swivel mount on the other side of the measuring field and comprises a light source for illuminating the article at a point in a predetermined direction. An optical system for forming an image of the illuminated point on a position-detecting optical-electrical receiving element is also mounted on said swivel mount on the other side of the measuring field. The spatial position of the distance sensor with respect to the scanner is invariable or is scanned by the scanner.

In such a measuring apparatus the scanner preferably comprises a light source for generating a sharply defined light beam, which is caused to perform an angular movement by a motor-driven rotating mirror, and to perform a parallel displacement by collimating means. Distances covered by the movement are detected in that countable pulses are generated by a pulse generator at a frequency which by feedback control systems is caused to be proportional to the instantaneous velocity of the movement of the light beam in the measuring field. In that measuring apparatus the optical-electrical scanner receiver for receiving the parallel-displaced light beam emitted by the scanner preferably comprises optical focusing means and a detector for generating the electric signals, which depend on the received light beam or on its vignetting by the article. The scanner and the receiver of that measuring apparatus in an aligned arrangement are well known and are described, for example, in German Patent Specification 28 49 252 which is incorporated herein by reference. In accordance with the present invention, the distance sensor which is scannable by the parallel-displaced light beam from the scanner is so arranged that the line of action of that sensor is oriented in the direction of movement of that light beam and at right angles to the latter. In a first embodiment the distance sensor comprises another light source for emitting a sharply defined light beam in the line of action of the distance sensor onto the article in the measuring field, an optical system for forming on a CCD line sensor at a certain angle to the line of action an image of that point of the article which is illuminated in the measuring field by the light beam, and an electronic system, which succeeds that line sensor and serves to generate electric signals in dependence on the position of the image of the point within the field of view.

By means of such a measuring apparatus the distance between the point which is illuminated by the light beam of the distance sensor and the light beam of the scanner at a predetermined boundary of the region which is vignetted by the article, e.g., at the first bright-dark transition during a parallel movement through the measuring field, can be determined in consideration of the spatial distance, detected by the light beam of the scanner, from the distance sensor to the scanner in the measuring direction, also to detect the change of the distance thus determined in dependence on the angular position of the motor-driven swivel mount, and, in dependence on the angular position of the motor-driven swivel mount, and, in dependence on the discontinuity of the detected change of the distance, which discontinuity is characteristic of the orientation of the light when it is parallel to the straight reference line, e.g., at a certain minimum, to determine the measured distance as the magnitude of the straight segment which is to be measured at the cross-section of the article.

In another embodiment of the measuring apparatus for carrying out the suggested measuring method, the axis of the optical system provided in the distance sensor and serving to form an image of the illuminated point is directed to coincide with the line of action of the distance sensor, the light beam for illuminating the point is moved over the surface of the article in the measuring field by means of another scanner by a parallel displacement at an angle which differs from that of the line of action, and a coincidence of the image of the illuminated point and of the axis of the image-forming optical system and a coincidence of the illuminating light beam and a predetermined reference position are detected by a method which is well known and described in from German Patent Specification 35 03 086 which is incorporated herein by reference and comprises comparing the component signals of bipartite detectors, and virtual amount of the parallel displacement of the illuminating light beam between the two coincidences in the direction of the axis of the image-forming optical system is determined as the magnitude of the distance from the surface of the article. For that purpose, another pulse generator generates countable pulses at a frequency which by feedback control systems is caused to be proportional to the instantaneous velocity of the movement of the illuminating light ray, as is well known and described, e.g. in German Patent Specification 28 49 252 which is incorporated herein by reference.

In such an embodiment of the measuring apparatus, influences which would be due to the limited resolution of a CCD line sensor are precluded and the distance measurement is substantially independent of the reflection characteristics of the surface of the article. But it has been found in practice that in the two embodiments just described in case of an undesirable angular position of the measuring system and in case of an undesirable reflecting behavior of the surface of the article the light beam of that partial system which determines the straight reference line or the light beam of the distance-detecting partial system will be deflected to the detector of the respective other partial system and will interfere with the measurement. That interference is avoided in that the two scanning operations are synchronized by means of known phase control circuits at such a phase angle that they will be performed in alternation and without an overlap.

In a preferred embodiment of the measuring apparatus the offset operation of the partial systems is achieved by optical means and in conjunction with a substantial simplification of the overall system in that only one scanner is used and the light beam emitted by that scanner is deflected during at least part of its parallel displacement by an optical deflector and, to detect the distance in the described manner during the remaining part of the displacement, the contour of the shade of the article is caused to perform a scanning movement through the measuring field for the determination of the straight reference line, wherein such an optical deflector, e.g., an anamorphotic lens system, is used that the point of intersection of the line of action of the distance sensor and the axis of the illuminating light beam is moved at the same velocity as the light beam for scanning the contour of the shade or the pulse generator for generating countable pulses is succeeded by a switchable frequency divider, which in response to the transition of the moving light beam from the region in which the distance is detected into the region in which the contour of the shade is scanned is so switched that pulses equal in number appear at the output of the frequency divider for each path length unit of the movement of the above-mentioned point of intersection and of the movement of the light beam for scanning the contour of the shade.

In the use of that preferred embodiment of the measuring apparatus it is possible during the time from the coincidence of the image of the illuminated point and the axis of the image-forming optical system to the arrival of the light beam at a predetermined boundary of the region which is vignetted by the article to deliver the pulses from the pulse generator or frequency divider to a single counter and to evaluate the count resulting there, in consideration of an offset value, as the distance, measured in the line of action of the distance sensor, from the illuminated point on the surface of the article to the axis of the light beam at the boundry of the shaded area.

It is an object of the invention to measure the cross-sectional dimensions also of elongate products in which the end points of a straight segment to be measured and those points on the periphery of the cross-section which define a straight reference line that is at right angles to that segment cannot be represented by a shadow projection in parallel light at the same time.

That object is accomplished in accordance with the invention in that those points on the periphery of the cross-section which lie on the straight reference line are scanned by means of a light beam, which is moved through the measuring field by a parallel displacement, when that light beam is parallel to the straight reference line and the cross-sectional dimension which is to be determined in measuring by a triangulating incident-light method, in which the light paths are substantially transverse to the light beam passing through the points of the straight reference line.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
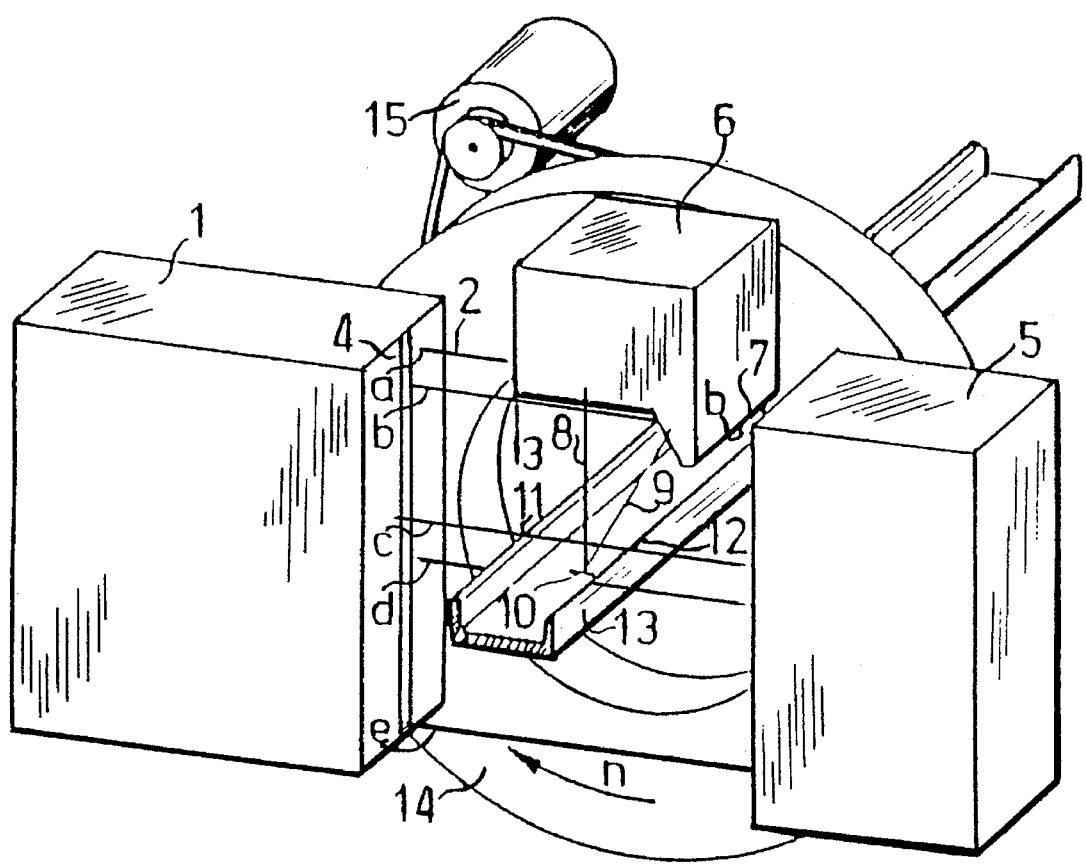
FIG. 1 is a schematic perspective view showing a measuring apparatus for carrying out the method in accordance with the present invention.

The scanner designated 1 in FIG. 1 emits a sharply defined light beam 2, which moves through a measuring field by a parallel displacement. This is indicated in the drawing by the arrow 3. The measuring field is defined in the direction of the beam by the exit window 4 of the scanner 1 and by the entrance window (4', which is concealed in the perspective view of FIG. 1) of an optical-electrical receiver 5 and in the direction of movement of the light beam by the edges of the openings of said two windows. The light beam 2 scans the spatial position of a distance sensor 6 at that housing edge 7 thereof which protrudes into the measuring field. In dependence on the mode of operation of the distance sensor 6, one of the two optical paths 8 and 9, which are shown as connected to the distance sensor 6 is identical to the axis of an illuminating system contained in the distance sensor 6 and the other path 9 or 8, is identical to the axis of an image-forming system, which is also contained in the distance sensor 6. Both systems are not shown in FIG. 1 because the mode of operation of the distance sensor can arbitrarily be chosen. Regardless of the mode of operation of the distance sensor, that optical path 8 which is at right angles to the moving (scanning) light beam 2 is identical to the line of action of the distance sensor 6. In that line of action, the distance sensor 6 detects changes of the distance from the distance sensor to a point 10 on a plane, which is at a predetermined distance from a surface of an article 13 disposed in the measuring field; that surface is scanned by the moving light beam 2 at further points 11 and 12. The moving light beam 2 is shown in certain phases of movement, in which its propagation is changed. Specifically, this refers in the position a designated to the entrance of the light beam 2 into the measuring field during the movement in the direction of the arrow 3, in the position b designated to the termination, detectable by the receiver 5, of a vignetting by the distance sensor 6 at its housing edge 7, in the position c designated to the renewed vignetting of the light beam at the points 11 and/or 12 of the article 13, in the position d designated to the termination of the vignetting by the article 13, and in the position e designated to the last vignetting of the light beam in its cycle of motion as the light beam leaves the measuring field. The receiver 5 can also detect the changes taking place at positions c, d, and e. The scanner 1, the optical-electrical receiver 5, and the distance sensor 6 are jointly mounted on a swivel mount 14, which is pivotally mounted by means now shown and is driven by a motor 15 so that the means 1, 5 and 6 are pivotally moved in unison continuously or intermittently and in a changing or consistent sense of rotation around the article to be examined, which is disposed in the measuring field. That movement is indicated in the drawing by the arrow n.

Figure 2:
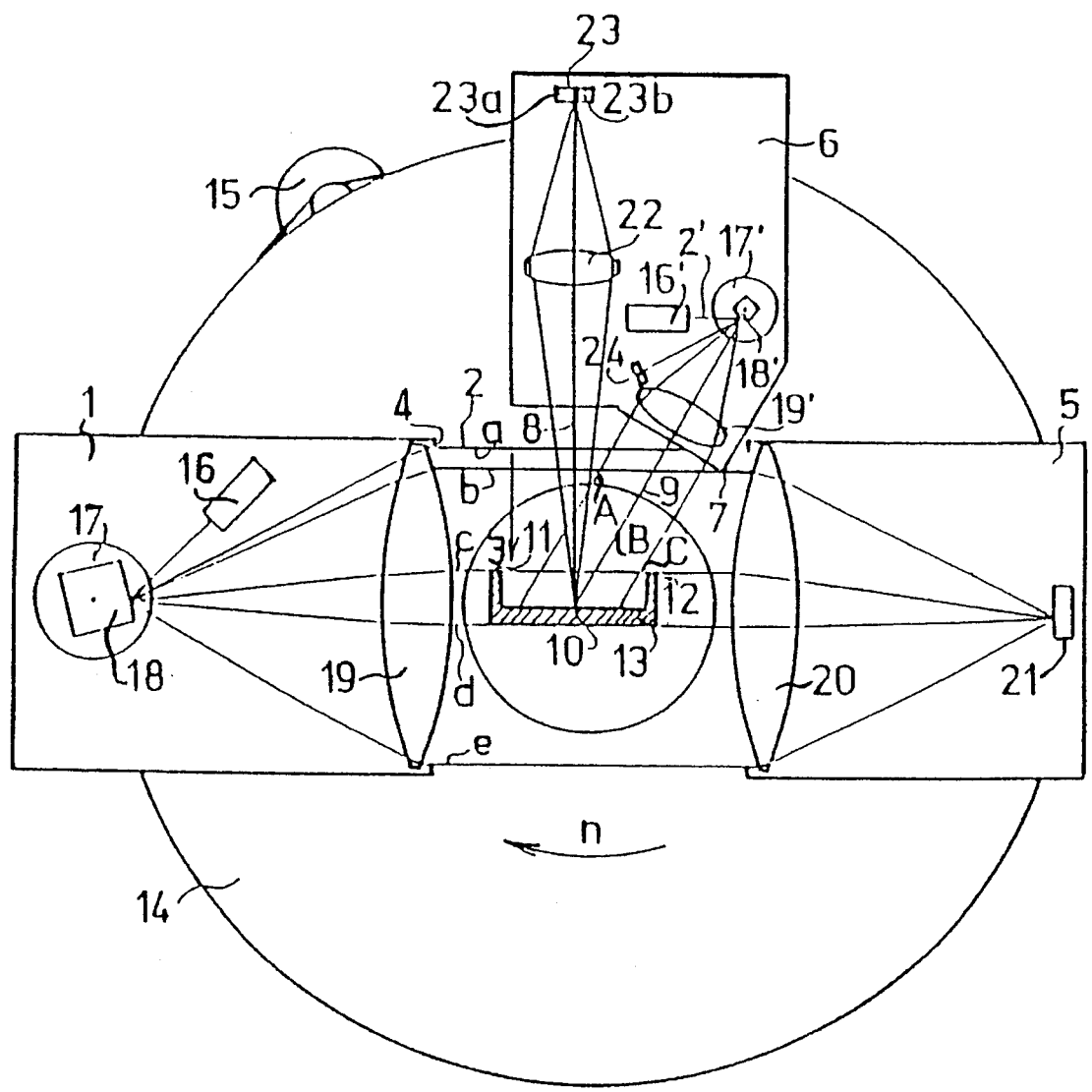
FIG. 2 is a front elevation showing the measuring apparatus of FIG. 1 with details of a selected embodiment.

FIG. 2 shows details of a preferred embodiment of the measuring apparatus of FIG. 1. The sharply defined light beam 2 is generated by a light source 16 and is incident on a rotating mirror 18, which is driven by a motor 17 to impart an angular movement to the light beam 2 when it has been reflected. During its angular movement, the light beam 2 is deflected by a collimator 19 to move through the measuring field by a parallel displacement, which is indicated in the drawing by the arrow 3. Those phases of the movement of the light beam 2 are shown in which the latter is at positions a, b, c, d and e and in which the propagation of the light beam 2 is changed as described hereinbefore. During those phases of the movement in which the light beam 2 is not vignetted the light beam 2 is deflected onto a detector 21 by focusing means 20, contained in the receiver 5. In dependence on said changes the signals generated by the detector 21 are subjected to changes, which by known means, not shown, are utilized, e.g., during the movement of the light beam 2 from position b to position c, to supply a pulse counter with pulses at a frequency which is proportional to the velocity of the movement of the light beam 2. The distance sensor 6 comprises a scanning illuminating system which illuminates the article from a first direction and, which comprises a light source 16', a motor 17', a rotating mirror 18', and a collimator 19', which cooperate in the same manner as the corresponding parts of the scanner 1. The light beam 2' which is moved by that illuminating system is shown in three positions A, B and C assumed during its movement through the measuring field. The light beam 2' enters the measuring field in position A, coincides in position B on the surface of the article to be examined with the axis of an image-forming system to be explained hereinafter, and leaves the measuring field in position C. The illustrated coincidence of the beam in position B and of the optical path 9, which is identical here to the axis of the illuminating system, is incidental and has no significance. The distance sensor 6 comprises also an image-forming system that consists of an image-forming optical system 22, the axis of which is oriented in a second direction. In the mode of operation of the distance sensor 6 chosen here the axis of that image-forming system or optical system is identical to the line of action of the distance sensor 6 in the optical path 8. That image-forming optical system 22 forms on a detector in a said direction an image of the surface of the article 13 to be examined. Owing to the movement of the illuminating light beam 2' a light flux which has been scattered by the surface is collected at a point, which is moved across the detector 23. That detector comprises two light-sensitive partial surfaces 23a and 23b, which in response to the light flux generate electric signals, which can separately be conducted. The partial surfaces 23a and 23b adjoin at a line, which is substantially transverse to the path of motion of the point which moves across the detector 23. The detector 23 is so mounted that the line and the above-mentioned path of movement cross in the axis of the image-forming optical system 22. The electric signals coming from the partial surfaces 23a and 23b are compared in an electronic circuit, not shown, and the light beam 2' is detected at its position B when the two partial surfaces are equally illuminated by the light flux scattered from the surface of the article 13. At that position B the light beam 2' crosses on the surface the axis of the image-forming optical system 22. Another bipartite detector 24 is disposed in a predetermined spatial reference position and is similarly used to detect the arrival of the light beam 2' at the reference position. The signals generated in response to the comparison of the signals from the detectors 23 and 24, respectively, during the movement of the light beam 2' from the reference position at the detector 24 to the position B are converted by known means, not shown, to pulses at a frequency which is proportional to the velocity of the movement of the light beam 2' and said pulses are delivered to a pulse counter.

Figure 3:
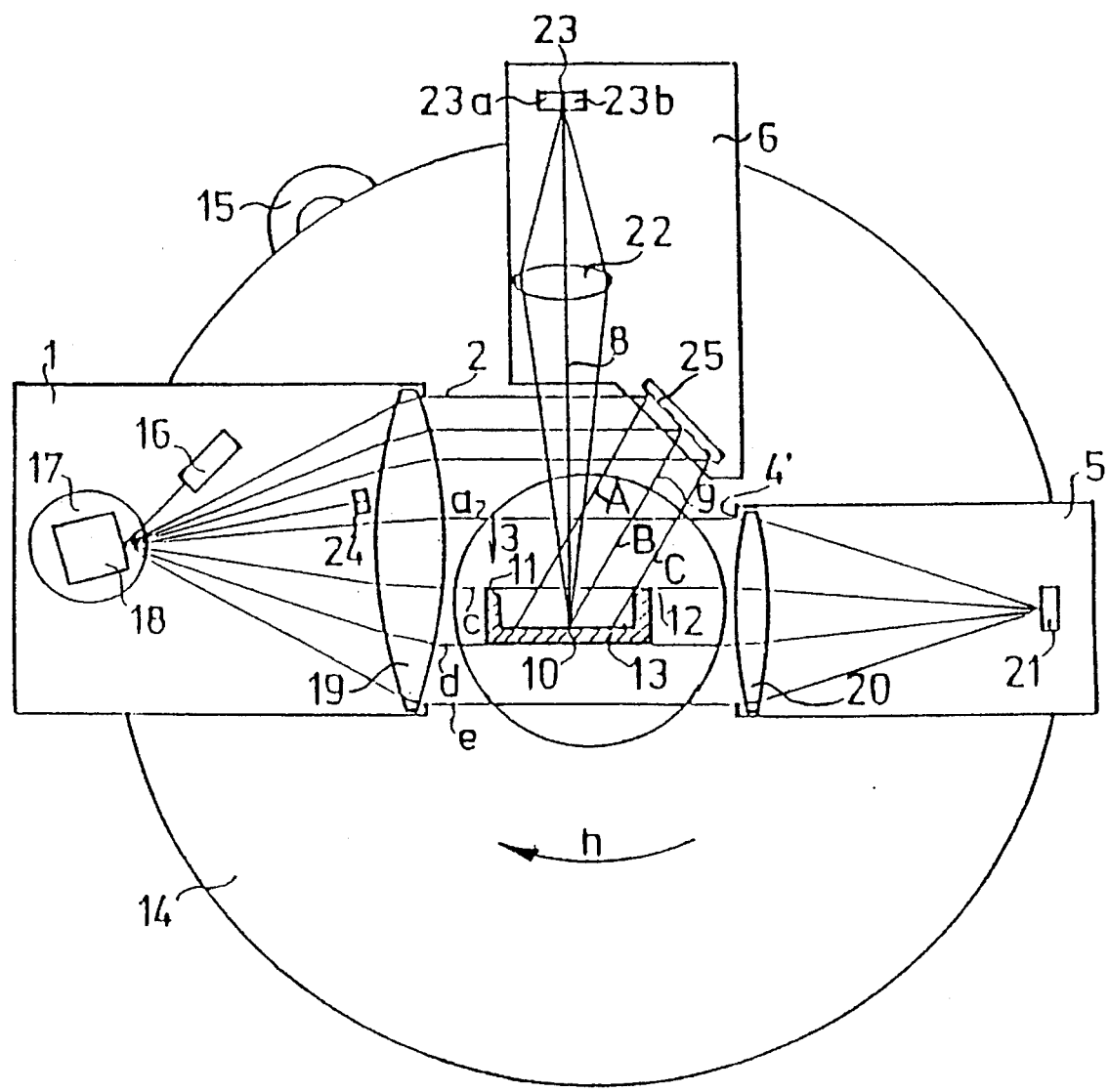
FIG. 3 is a front elevation showing the measuring apparatus of FIG. 1 with details of a preferred embodiment, which is a modification of FIG. 2.

FIG. 3 shows an embodiment in which a single light beam 2 is used at different times and in different positions for the distance measurement and for defining the straight reference line, respectively. During a part of the parallel displacement imparted to the light beam 2 by the scanner 1, the light beam 2 which has been deflected by an optical deflector 25 is propagated in such a direction and moved in such a direction that the light beam at an angle that differs from the axis of the image-forming optical system 22 transverses the point 10 which is disposed on the surface of the article and the distance of which from the straight reference line is to be measured. Owing to the strict coordination with respect to position and time of the resulting phases of the movement of the light beam 2 it is possible in this embodiment during the movement of the light beam 2 from position B to position c to supply a single pulse counter with pulses for determining the distance from the point 10 to the axis of the light beam 2 in position c. Necessarily it is ensured that the number of pulses to be counted per unit of the path length covered by the movement of the light beam 2 in the direction of the optical path 8 from position A to position C after the light beam has been deflected by the deflector 25 equals the number of pulses to be counted per unit of the path length covered by the movement through the positions a to e, when the light beam is not influenced by the deflector 25. In the embodiment shown in FIG. 3 this is accomplished in that the pulse frequency of the pulses to be counted is switched, e.g., by a frequency divider, not shown, when the light beam 2 arrives at the reference position detected by the detector 24. In an arrangement which differs from that shown in FIG. 3 such a switching will not be required because the optical deflector 25 consists of a pair of Littrow prisms in such an anamorphotic arrangement that before and after the deflection of the light beam 2 by the deflector 25 the light beam 2 moves at the same velocity along the line of action of the distance sensor 6, which line is identical to the optical path 8.

Figure 4:
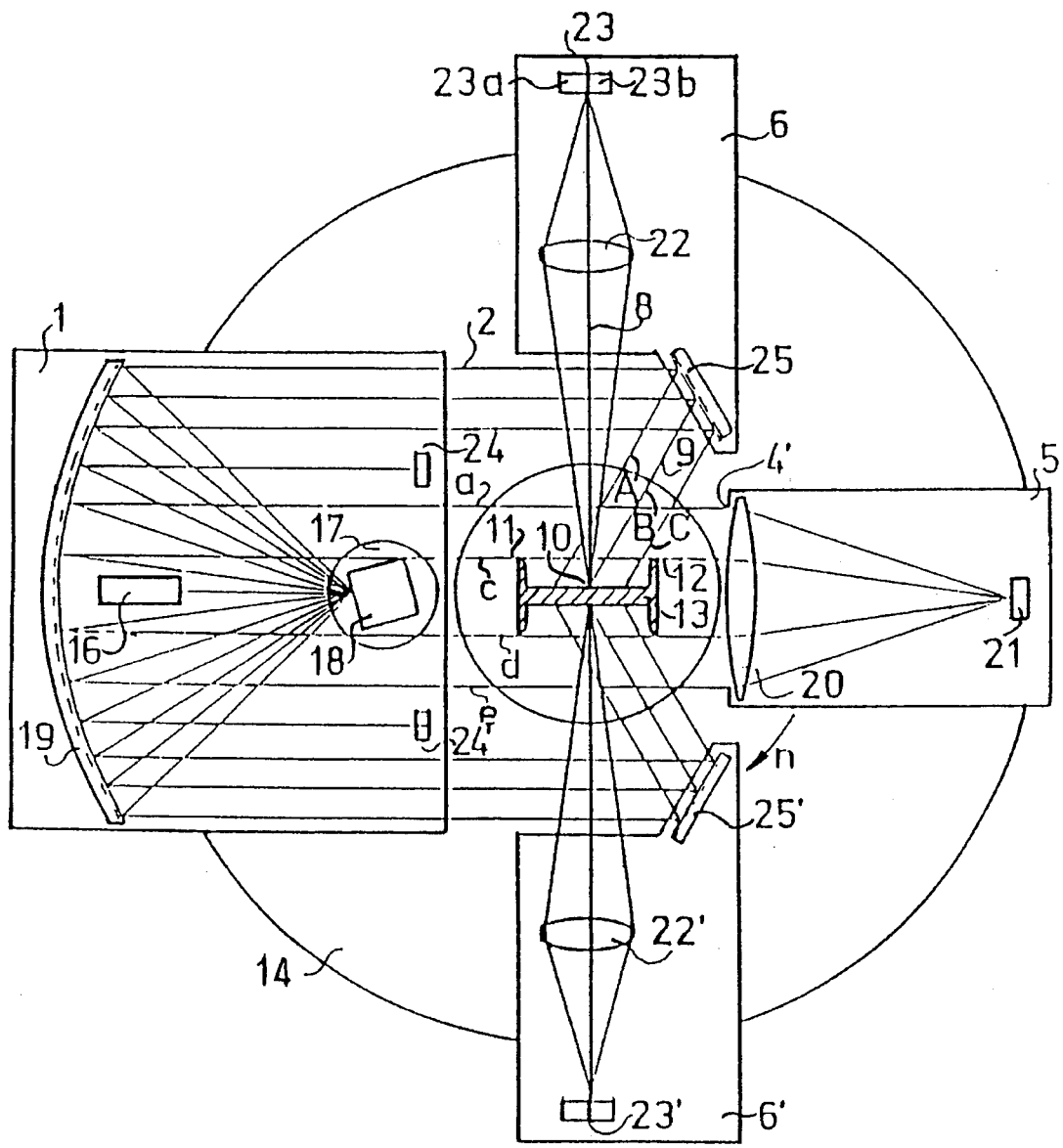
FIG. 4 is a front elevation showing the measuring apparatus of FIG. 1 with details of an embodiment which is an extension of FIG. 3.

The embodiment of the measuring apparatus shown in FIG. 4 comprises a further distance sensor 6' that has the same mode of operation as the distance sensor 6. Because the two distance sensors 6 and 6' are diametrically opposite to each other it is possible to measure further points on the surface of the article which is to be examined. For instance, when the swivel mount 14 is in the illustrated position relative to the orientation of the cross-section of the article consisting of an I section, it is possible to measure also its web thickness at the point 10 at right angles to the straight line of reference which contacts the points 11 and 12. The large number of measurements which can be performed also on other sectional shapes owing to the arrangement in accordance with the invention is made particularly clear in FIG. 4 because all signal changes at the detectors 21, 23 and/or 23' which are caused by the article to be examined in dependence on its spatial position and dimensions and the relations of said signal changes to each other or to the signal changes at the detectors 23 and/or 24' can be utilized to determine the position and/or spacing of the instantaneously scanned points on the surface of the article.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An optical-electrical measuring process which employs a device for determining cross-sectional dimensions of particularly elongate articles with reference to at least one straight line which is applied to the periphery of the cross-section and contacts said periphery at a plurality of points, wherein a sharply defined first light beam is moved by a parallel displacement in a measuring field so that boundaries of a region which is vignetted in the measuring field by an article to be examined are traversed by the first light beam at measurable points in the measuring field, the process comprising the steps of:

(1) using a second light beam after said second light beam has been deflected to illuminate a surface of the article at a point from a first direction;

(2) determining a distance, from an axis of the first light beam at a predetermined boundary of said region, of said point by forming an image of said point in a second direction and evaluating a position of said image, by triangulation;

(3) pivoting the device relative to a cross-section of the article about an axis which is parallel to a longitudinal axis of the article so that said distance is changed in dependence on an angular position of said device;

(4) detecting a discontinuity which is characteristic of an angular position of the device in a change of said distance in which position the axis of the first light beam at the location of the predetermined boundary of the vignetted region contacts the periphery of the cross-section at a plurality of separated points; and (5) positioning, by said parallel displacement of the first light beam and by pivoting of the device, the axis of the first light beam in contact with a pair of points which are spaced apart and regarding such axis as the straight reference line and then further regarding said distance as the cross-sectional dimension which is determined with reference to said reference line.

2. The device employed in the process of claim 1 including:

a swivel mount pivotally movable about the article;

a scanner disposed on said swivel mount and on one side of the measuring field, said scanner generating a first scanning light beam, said scanner having a scanning movement wherein said first scanning light beam is rapidly moved through the measuring field by a parallel displacement;

an optical-electrical receiver mounted on a second side of the measuring field of said swivel mount, said optical-electrical receiver serving to receive said first scanning light beam and to generate electric signals in dependence on a vignetting of said first scanning light beam;

a distance sensor mounted on said swivel mount on said second side of the measuring field and having a line of action which crosses said first scanning light beam in the measuring field, said distance sensor being in a fixed position relative to said scanner.

3. The device of claim 2 wherein said distance sensor includes:

an optical-electrical distance sensor;

a light source for illuminating the article at an illuminated point in a first direction; and an optical system for forming an image of the illuminated point in a second direction on a position-detecting optical-electrical receiving element.

4. The device of claim 3 wherein said optical-electrical receiving element includes:

two receiver portions having output signals and separated by a boundry, said two receiver portions providing said output signals which are compared for detecting a position of said image of said illuminated point of said article.

5. The device of claim 2 wherein said distance sensor includes:

a scanning illuminating system having a second scanning light beam which illuminates the article from a predetermined direction;

an optical system which forms images of a plurality of points of a surface of the article on an optical-electrical receiving element, said optical system having an optical axis which has a predetermined orientation in relation to a longitudinal axis of said second scanning light beam of said scanning illuminating system.

6. The device of claim 5 wherein said scanning illuminating system includes:

a laser light source for emitting said second scanning light beam;

a rotating mirror assembly for reflecting said second scanning light beam; and a collimator disposed in the path of said second scanning light beam.

7. The device of claim 5 wherein said scanning illuminating system includes:

deflecting means which are traversed by a plurality of said first scanning light beams of said scanner so that said first scanning light beams when they have been deflected constitute deflected scanning light beams which are generated by a second illuminating system of the distance sensor and illuminate the article in a predetermined direction.

8. The device of claim 7 wherein:

said deflecting means includes a planar mirror; and said first scanning light beam of said scanner is evaluated by a counting of pulses from a pulse source, said pulses having a frequency that is proportional to a velocity of a scanning movement of said first scanning light beam of said scanner; and a scanning of said deflected scanning light beams of said scanning illuminating means of said distance sensor is evaluated by said pulses being counted after a switched frequency change.

9. The device of claim 7 wherein said deflecting means includes:

a plurality of Littrow prisms provided in an anamorphotic arrangement wherein said scanning movement of said first scanning light beam of said scanner is performed at an equivalent velocity before and after said first scanning light beam is deflected.

10. The device of claim 2 wherein:

said scanner scans a reference edge of said distance sensor in order to establish a fixed relation between an instantaneous position of said first scanning light beam of said scanner and an output signal of the distance sensor.

11. The device of claim 2 including:

two mutually opposite distance sensors which are symmetrically disposed about said scanner and said optical-electrical receiver and said distance sensors having lines of action that cross said scanning light beam of said scanner in the measuring field.

12. The device of claim 2 wherein:

said scanner scans a reference surface of said distance sensor in order to establish a fixed relation between an instantaneous position of said first scanning light beam of said scanner and an output signal of said distance sensor.

13. An optical-electrical measuring process which employs a device for determining cross-sectional dimensions of particularly elongate articles with reference to at least one straight line which is applied to the periphery of the cross-section and contacts said periphery at a plurality of points, wherein a sharply defined first light beam is moved by a parallel displacement in a measuring field so that boundaries of a region which is vignetted in the measuring field by an article to be examiner are traversed by the first light beam at measurable points in the measuring field, the processing comprising the steps of:

(1) using a second light beam to illuminate a surface of the article at a point at a first direction;

(2) determining a distance, from an axis of the first light beam at a predetermined boundary of said region of said point by forming an image of said point in a second direction and evaluating a position of said image, by triangulation;

(3) pivoting the device relative to a cross-section of the article about an axis which is parallel to a longitudinal axis of the article so that said distance is changed in dependence on an angular position of said device;

(4) detecting a discontinuity of change of measuring values being characteristic of an angular position of the device, in which position the axis of the first light beam at the location of the predetermined boundary of the vignetted region contacts the periphery of the cross-section at a plurality of separated points; and (5) positioning the axis of the first light beam in contact with a pair of points which are spaced apart and regarding such axis as the straight reference line and then further regarding said distance as the cross-sectional dimension which is determined with reference to said reference line.

* * * * *